United States Patent Office 3,488,249
Patented Jan. 6, 1970

3,488,249
LAMINATING ADHESIVES AND LAMINATES
Leon Edward Wolinski, Buffalo, N.Y., assignor to E. I. du Pont de Nemours and Company, Wilmington, Del., a corporation of Delaware
No Drawing. Filed June 15, 1966, Ser. No. 557,636
Int. Cl. B32b 31/06, 27/30
U.S. Cl. 161—185                                   8 Claims

ABSTRACT OF THE DISCLOSURE

A laminating adhesive-printing ink vehicle composition comprising essentially an organic solvent solution of (1) a vinyl polymer such as the iminated copolymer of butyl acrylate/butyl methacrylate/methyl methacrylate/methacrylic acid; and (2) the product of partially reacting (a) an epoxy ether such as diglycidyl ether of resorcinol, with (b) an ethylenically unsaturated compound such as maleic acid.

---

This invention relates to compositions of matter particularly useful as laminating adhesives and as non-smear printing ink vehicles in the production of laminate structures comprising reverse-printed polyvinyl fluoride film laminated to a polymeric substrate having unhindered ethylenic unsaturation (e.g. polyester-styrene resin); and to laminates prepared with said compositions.

Commercially available adhesive-printing ink vehicle compositions used in the production of laminate structures comprised of a base of polymeric material, e.g., fiber-reinforced, unsaturated polyester resin, and a protective surface of reverse-printed, polyvinyl fluoride film have two major defects, namely, (1) loss of adhesive bond strength on exposure to light and/or moisture, and (2) smearing of the printing pattern during the molding-curing operation.

The principal object of this invention is to provide a laminating adhesive-printing ink vehicle composition free of the stated defects. A further object is to provide tightly bonded laminates comprising reverse-printed polyvinyl fluoride film adhered through the agency of an adhesive to a polymeric substrate. The foregoing and related objects will more clearly appear hereinafter.

These objects are realized by the present invention which, in essence, comprises an adhesive-printing ink vehicle composition comprising essentially an organic solvent solution of (1) a vinyl polymer having attached to the carbon-carbon-chain mono-valent radicals of the formula $$-\overset{O}{\underset{\|}{C}}-O-Z-\overset{R}{\underset{R_1}{\overset{|}{N}}}\overset{H}{\underset{R_{11}}{\diagdown}}$$

wherein: Z is an aliphatic hydrocarbon radical of 2 to 3 carbon atoms; R is selected from the group consisting of hydrogen and alkyl radicals of from 1 to 8 carbon atoms; $R_1$ is selected from the group consisting of hydrogen, hydroxyl radicals and alkyl radicals of from 1 to 8 carbon atoms; and $R_{11}$ is selected from the group consisting of hydrogen, non-tertiary alkyl radicals of from 1 to 8 carbon atoms and omega-hydroxy substituted non-tertiary alkyl radicals of from 1 to 8 carbon atoms; the amino nitrogen content of said vinyl polymer being at least 0.01%, based on weight of the vinyl polymer; and (2) the reaction product of (a) an epoxy ether partially reacted with (b) an ethylenically unsaturated compound of the formula:

$$R_7-\overset{H}{\underset{|}{C}}=\overset{R_3}{\underset{|}{C}}(R_4)_nA-H$$

wherein: $R_3$ is selected from the group consisting of hydrogen, carboxyl and alkyl radicals of from 1 to 4 carbon atoms, $n$ is zero or 1 and when $n$ is 1 $R_4$ is a divalent radical selected from the group consisting of divalent alkoxy, carbo-alkoxy, aromatic hydrocarbon, aliphatic hydrocarbon, and alicyclic hydrocarbon radicals, A is selected from the group consisting of $$-O-,\ -NH-,\ -\overset{O}{\underset{\|}{C}}-O-,\ -S-,\ \text{and}\ -\overset{O}{\underset{\underset{O}{\|}}{S}}-$$

and $R_7$ is selected from the group consisting of hydrogen, carboxyl carboalkoxy, hydroxy, sulfhydryl, sulfonic, amino, and non-hindered alkyl and alkyl-aromatic groups, said reaction product having unhindered ethylenic unsaturation, an epoxide equivalent of from 50 to 3000, and a bromine number of from 0.1 to 100; said components (1) and (2) being present in a ratio, by weight, of from 1:99 to 99:1.

The preferred general procedure for preparing the aminoester modified vinyl polymers constituting component (1) of the composition of this invention is to first prepare a vinyl polymer, of essentially the desired final structure, containing no amino groups, but instead, having suitable reactive groups, then react the preformed vinyl polymer with a reagent which converts a portion, or all, of the reactive groups into aminoester groups. In carrying out this procedure, it is generally preferred that the ethylenically unsaturated copolymerizable monomers used to prepare the initial vinyl polymer be combined in a suitable solvent in the presence of a polymerization catalyst and the polymerization reaction be preformed at a conveniently controllable elevated temperature, for example at reflux at a constant pressure, until polymerization is essentially complete; the reagent for introducing the aminoester groups into the preferred vinyl polymer is then introduced into the polymer solution and the solution maintained at an elevated temperature until the reagent has been consumed. The resulting solution of aminoester modified vinyl polymer is satisfactory for combining directly with the reaction product, component (2), to form an adhesive solution of this invention, since any small amounts of unreacted monomers or reaction by-products which may be present do not exert any undesirable effects, providing the critical features of the invention are properly controlled.

Preferred vinyl resins for use in the adhesive mixture of this invention are those containing 80–97% of one, or a mixture of two or more, of the acrylate or methacrylate esters derived from the lower aliphatic alcohols having 1 to 8 carbon atoms and containing, in addition, a sufficient proportion of a methacrylate ester, having one of the following primary-amino-substituted radicals, to provide the desired quantity of amino nitrogen:

(1)                  $-CH_2-CH_2-NH_2$ (2)                  $-CH_2-\underset{\underset{CH_3}{|}}{C}H-NH_2$ (3)                  $-\underset{\underset{CH_3}{|}}{C}H-CH_2-NH_2$ (4)                  $-CH_2-\underset{\underset{OH}{|}}{C}H-CH_2-NH_2$ (5)                  $-CH_2-\underset{\underset{NH_2}{|}}{C}H-CH_2-OH$ Although the preferred aminoester modified vinyl polymers for use in the adhesive mixture of this invention are those composed predominantly of the lower alkyl acrylic or methacrylic esters, it should be pointed out that the composition of the bulk of the vinyl polymer is not critical. It should be emphasized, however, that to be suitable for use in this invention, the aminoester substituted vinyl polymer must be reasonably soluble in volatile organic solvents, contain at least 0.01% amino nitrogen, and the amino groups must have at least one

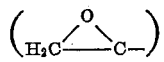 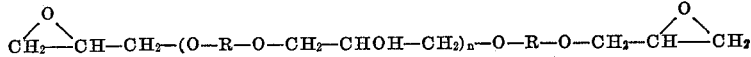 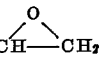

hydrogen which is unhindered by bulky tertiary alkyl groups, such as tert. butyl, attached to the amino nitrogen. If the amnio groups in the ester radical of a vinyl polymer contain no hydrogen atom, i.e., the groups are tertiary, or if the amnio groups are hindered, then the vinyl polymer in combination with an epoxy resin will not yield an adhesive having the high adhesive strength at high humidity that is required of the adhesive of this invention. It is believed that the unhindered amino hydrogens of the vinyl polymers of this invention promote adhesion through hydrogen bonding to subtrate materials with which they are brought into contact.

Further details of the general procedure for preparing the aminoester modified vinyl polymers, as well as alternative procedures, and the resulting products, are fully described in United States Patent No. 3,228,823 in the names of Hugo R. Usala and Leon E. Wolinski, which patent disclosure is incorporated herein by reference.

Epoxy ethers suitable for use in the compositions of the invention comprise those having a 1,2-epoxy equivalency greater than 1. By "epoxy equivalency" is meant the average number of 1,2-epoxy groups

per molecule of the epoxy ether. Where a specific epoxy ether is involved in contrast to a mixture of ethers, the epoxy equivalency will be an integer. Thus, the epoxy equivalency of a specific compound such as the diglycidyl ether of bis(4-hydroxyphenyl)-2,2-propane is two while that of the triglycidyl ether of a glycerol is three. Inasmuch as commercial epoxy ethers are usually mixtures of a number of specific ethers of different molecular weights, the epoxy equivalency is necessarily in such cases an average value, and is unlikely to be an integer. An epoxy equivalency of 1.32, for example, means that there are an average of 1.32 epoxy groups per molecule of the epoxy ethers present in the mixture. The epoxy equivalency is determined by dividing the measured average molecular weight by the epoxide equivalent weight. The "epoxide equivalent weight" is the weight of the epoxy ether which contains one equivalent weight of a 1,2-epoxy group.

Suitable epoxy ethers include, preferably, polyethers such as the 1,2-epoxy-containing polyethers of polyhydric alcohols (i.e., alcohols containing at least two alcoholic OH groups) or of polyhydric phenols (phenols containing at least two groups attached to a nuclear carbon atom).

Suitable polyethers of polyhydric alcohols include the polyglycidyl polyethers of ethylene glycol, trimethylene glycol, butylene glycol, dipropylene glycol, glycerol diglycerol, erythritol, pentaglycerol, pentaerythritol, mannitol, sorbitol, polyallyl alcohol, polyvinyl alcohol, inositol, p-xylylene glycol, etc. These polyglycidyl polyethers may be prepared according to well-known methods.

Suitable polyethers of polyhydric phenols include, for example, the polyglycidyl polyethers of dihydric phenols, including mononuclear phenols such as resorcinol, catechol, hydroquinone and methyl resorcinol and polynuclear phenols such as 4,4'-dihydroxy benzophenone, 1,5-dihydroxy naphthalene and particularly the alkylene bisphenols such as 2,2-bis(4-hydroxyphenol) propane, 1,1-bis(4-hydroxyphenyl) propane, 1,1-bis(4-hydroxyphenyl) isobutane, 2,2-bis(4-hydroxyphenol) butane, 2,2-bis(4-hydroxy-2-methylphenyl) propane, 1,1-bis(4-hydroxyphenyl) 2-methyl propane, 3,3-bis(4-hydroxyphenyl) pentane, 1,1-bis(4-hydroxyphenyl) 2-ethyl hexane, and bis(4-hydric phenols may be prepared according to well-known methods. The usually complex mixture of products may droxyphenyl) methane. The glycidyl ethers of the polybe generally represented by the formula where R represnts a divalent hydrocarbon radical of the dihydric phenol and where $n$ is an integer of the series 0, 1, 2, 3, etc. The average length of the chain enclosed in the parentheses can be varied.

The preferred epoxy resins for use in this invention are the diphenylolpropane diglycidyl ethers which are obtained by reacting epichlorohydrin and 2,2-bis(4-hydroxyphenyl) propane at an elevated temperature in the presence of a strong base, such as sodium hydroxide.

The prime feature of the composition of this invention is that the (2) component thereof must have, in addition to unreacted epoxy groups as represented by an epoxide equivalent of from 50 to 3000, unhindered ethylenic unsaturation to a degree represented by a bromine number of from 0.1 to 100 ("Organic Analysis," vol. 3, pp. 203–367; Interscience Publisher New York City, N.Y., 1956). As indicated above unhindered ethylenic unsaturation is obtained by partially reacting the epoxy ether with a compound of the formula:

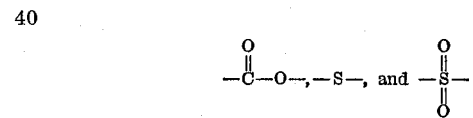

wherein $R_3$ is selected from the group consisting of hydrogen, carboxyl, and alkyl radicals containing from 1 to 4 carbon atoms, $n$ is zero or 1 and when $n$ is 1, $R_4$ is a divalent radical selected from the group consisting of alkoxy, carbo-alkoxy, aromatic hydrocarbon, aliphatic hydrocarbon and alicyclic hydrocarbon radicals, A is selected from the group consisting of —O—, —NH—, $$-\overset{O}{\underset{}{C}}-O-, -S-, \text{ and } -\overset{O}{\underset{O}{\overset{\|}{S}}}-$$

and $R_7$ is selected from the group consisting of hydrogen, carboxyl carboalkoxy, and unhindered alkyl and alkylaromatic groups. As representative examples having the formula specified there may be cited: crotonic acid, angelic acid, hydrosorbic acid, cinnamic acid, m-chlorocinnamic acid, p-chlorocinnamic acid, alpha-cyano cinnamic acid, umbellic acid, and other monoolefinic monocarboxylic acids; sorbic acid, alpha-methyl sorbic acid, alpha-ethyl sorbic acid, alpha-chloro sorbic acid, alpha-methyl-gamma benzal crotonic acid, beta-(2-butenyl)acrylic acid, 2,4-heptadieneoic acid, 2,4-pentadienoic acid, 2,4,6-octatrienoic acid, 1-carboxyl-1-ethyl-4-phenyl butadiene-1,3, 2,6-dimethyl decatriene-(2,6,8)-oic-10, alpha-beta isopropylidene propionic acid, alpha-vinyl cinnamic acid, alpha-isopropenyl-furfural acetic acid, alpha-isopropenyl-cinnamenyl acrylic acid, and other polyolefinic monocarboxylic acids; hydromuconic acid, glutaconic acid, maleic acid, fumaric acid, and other monoolefinic polycarboxylic acids; 3-carboxy-pentadiene-(2,4)-oic-1, muconic acid, and other polyolefinic polycarboxylic acids, acrylic acid, alpha-chloro acrylic acid, methacrylic acid, ethacrylic acid, alpha-isopropylidene acrylic acid, alpha-styryl acrylic acid (2-carboxyl-4-phenyl butadiene-1,3), beta-vinyl acrylic acid (1-carboxy butadiene-1,3), alpha-vinyl acrylic acid, beta-acryloxy propionic acid, itaconic acid, and others. It is preferred to use a monoolefinic monocarboxylic acid having its olefinic double bond in the alpha-beta position with respect to the carboxyl group and containing a terminal methylene group. In addition, other compounds such as, styrene-sulfonic acid, styrene-p-carboxylic acid, 1-thiolpentene-4, beta-aminoethyl vinyl ether, beta-amino ethyl acrylate and allyl alcohol may be employed in this invention.

The prefered adhesive compositions of this invention are volatile organic solvent solutions of the aforementioned adhesive polymer components wherein the total weight of the components dissolved in the solvent make up about 20–60 weight percent of the solution. Because of its low cost, high volatility, and good solvent power, the preferred solvent for the adhesive mixtures of this invention is a mixture of isopropyl alcohol and toluene in the ratio by weight of about 30 to 70; however, the nature of the solvent is not critical. Other suitable solvents which can be used, either individually or in mixtures, include the common commercially available alcohols, esters, ketones, aromatic hydrocarbons and halogenated hydrocarbons, e.g., methyl, ethyl, n-propyl, n-butyl alcohols; methyl, ethyl, propyl, and butyl acetates and propionates; acetone, methylethyl and diethyl ketones; benzene and the xylenes; and, ethylene chloride, chloroform and carbon tetrachloride.

The adhesive compositions of my invention, while of general utility, are particularly effective and find their chief application in the production of laminates comprised essentially of surface-receptive polyvinyl fluoride film carrying printing or decorative matter on the adhered surface (reverse printing), and a substrate of a thermosetting resin having unhindered ethylenic unsaturated sites at the surface, e.g. unsaturated polyester resin.

The polyvinyl fluoride film is rendered surface receptive by any of the chemical, electrical or flame treatments known to the art and described in the aforementioned United States Patent No. 3,228,823.

Thermosetting resins which may be employed as the substrate include various thermosetting materials, such as the polyesters and polyester-styrene blends, alkyd resins and variations of the synthetic thermosetting materials which may be made by one skilled in the art to produce a resin originally via liquid state which is capable of polymerization to a hard, strong and solid mass. Because of their commercial importance as structural materials the preferred substrates are those comprising unsaturated polymeric esters commonly prepared by condensing under polymerizing conditions, either (1) an ethylenically unsaturated dicarboxylic acid with a diol containing no ethylenic unsaturation, (2) a dicarboxylic acid containing no ethylenic unsaturation with an ethylenically unsaturated diol, or (3), and most commonly, a mixture of ethylenically unsaturated dicarboxylic acids and dicarboxylic acid containing no ethylenic unsaturation, with a diol containing no ethylenic unsaturation. The resulting polyester is cross-linked through the agency of one or more addition-polymerization agents, e.g. styrene, and the structures formed therefrom are commonly reinforced by fibrous materials, particularly glass fibers.

The following examples will serve to further illustrate the principles and practice of my invention.

In the examples the laminates are characterized by the following tests:

*Adhesive bond strength.*—Adhesive bond strength is a measure of the ease of removing polyvinyl fluoride film from a substarte after the adhesive has set. The test is conducted by cutting through the film layer of the laminate with a razor blade in a number of lines 1/8 inch apart, cutting the ends of the resulting section of film away from the substrate, then attempting to strip the individual sections of film away from the substrate with a pair of tweezers. If the 1/8 inch sections of film can be stripped from the substrate, the adhesive is unsatisfactory for use in the continuous production of weather-resistant laminates, which is designated as NO; if the film sections cannot be stripped loose from the substrate, but break instead, the bonding is considered satisfactory and is designated CNS (cannot be stripped); if the film sections tear instead of break, the film bonding also is considered satisfactory and is designated T. In some cases, the adhesive bond strength is expressed as the force in grams/inch, applied at an angle of 90°, at a rate of 12 inches/minute, required to separate the polyvinyl fluoride film from the substrate.

*Boil test.*—The boiling water immersion test is an evaluation of the adhesive bond strength of a laminate after the laminate has been exposed continuously to boiling water for a period of time. To conduct the test, a series of samples are exposed to boiling water and from time to time a sample is removed and tested as described above and examined for blisters. The results are expressed as the length of time the samples retained CNS bonding and developed no blisters. The results are expressed as the force in grams per inch per unit length of time that the sample retained CNS bonding or developed no blisters.

*Visible light test.*—In this test, samples of laminar articles having an adhesive interlayer between contiguous layers thereof are subjected to the action of actinic light for varying periods of time. This is achieved by placing the samples to be tested a distance of six inches from a bank of 500 watt incandescent flood lamps while the sample is maintained submerged under 1/4-inch of water of 55° C. temperature. The test samples are then evaluated for adhesive bond strength in the manner above described.

*Smear test.*—A series of X's were stamped into a template. The X's were 1 inch high, 3/4 inch on the base and 1/8 inch thick. The ink formulations were formed in a pattern of 4 x 4 X's by spraying. The inks were dried for 1 to 3 minutes or even overnight depending on the test conditions. (Time was used as a variable.)

The printed side was then placed against the unsaturated polyester/styrene/glass fiber mat which is used to produce exterior trim panels for station wagons. This was cured in a press at 125° C. for 2½ minutes at 100 p.s.i. The cured structure was examined for "smearing" (distortion of the X's).

The X's were measured and compared to the original. The percent increase in the X's was recorded as "percent smeared." Thus an X which was 1/8 inch wide originally and was distorted to 3/16 inch would be $$(3/16 / 1/8)(100\%) = 50\%$$

smeared.

EXAMPLE 1

An adhesive composition-ink vehicle was prepared as follows:

(1) 9.7 grams of—
  400 grams of 35% solids in toluene/isopropanol (70/30 weight ratio) of BA/BMA/MMA/MAA[1] 9.0/45.7/35.3/10.0-iminated with propylene imine at a ratio of 1.3/1.0, imine to acid.
with—
  46.5 grams of brown pigment (Williams B5–3868–F)
(2) 1.0 grams of—
  46% solids in toluene of Kopox 159 (Kopper Co.-diglycidyl ether of resorcinol)
and 2.0 grams of—
  200 grams of 40% solids in N,N-dimethyl acetamide of poly-(butyl methacrylate/glycidyl methacrylate) (80/20 weight ratio)
  9.7 grams of methacrylic acid stirred overnight at 90° C.
Epoxide equivalent[2] Initial polymer contained $1.45 \times 10^{-3}$ epoxy equivalents/gram of solid polymer. Final polymer contained $4.8 \times 10^{-4}$ epoxy equivalents/gram of solid polymer.
Bromine number—9.3 gram/100 gram (theoretical 10.1 gram/100 gram) based on solids only.

---
[1] BA—butyl acrylate; BMA—butyl methacrylate; MMA—methyl methacrylate; MAA—methacrylic acid.
[2] In this example, the (2) component, theoretical epoxy equivalent is essentially zero since an equimolar epoxy/acid ratio was used. All of the acid did not react with the epoxy but presumably may have reacted with the other OH group to form a double ester on the carbon.

A 1 mil, surface-receptive, film of clear polyvinyl fluoride containing ultraviolet light absorber (3 weight percent of poly(4-methyl-acryloxy-2-hydroxybenzophenone)) was printed with the above adhesive composition-ink vehicle in a pattern, as described in the smear test, and then cured by heating at 100° C. for one hour (dried adhesive thickness-0.2 mil) and subsequently laminated to a 22 mil thick panel of an unsaturated polyester resin prepared as follows:

Seventy-five parts, by weight, of a mixture consisting of about 20% by weight of methyl methacrylate and about 80% by weight of an unsaturated polyester formed by reacting a slight stoichometric excess of propylene glycol with a mixture consisting of about 60 mol percent of phthalic anhydride and about 40 mol percent of maleic anhydride.

20 parts of styrene
0.5 part of benzoyl peroxide
0.5 part of a 60% solution of methyl ethyl ketone hydroperoxide in dimethyl phthalate.
0.05 part of a solution consisting of about 6 parts by weight of cobalt naphthenates and about 51 parts by weight of naphthenic acids dissolved in about 43 parts by weight of mineral spirits.

The resin curing and lamination was carried out at 125° C., and at a pressure of 100 p.s.i. for 2½ minutes. (Cured resin thickness—22 mils.) The resulting laminate exhibited no "smear" of the printed pattern. The laminate bonds were CNS initially and after one week in boiling water and in the visible light test.

EXAMPLE 2

Example 1 was repeated using only 4.9 grams of methacrylic acid. The resulting component had $8.5 \times 10^{-4}$ epoxide equivalents per gram of solid polymer and a bromine number of 4.7 gram/100 grams (theoretical 5.05 grams/100 grams). Thus, more epoxy groups were available to participate in the condensation cross-linking reaction. Similar tests as in Example 1, gave substantially the same results.

EXAMPLE 3

An adhesive composition-ink vehicle was prepared as follows:

(1) 9.75 grams of
400 grams of 35% solids in toluene/isopropanol (70/30 weight ratio) of BA/BMA/MMA/MAA-9.0/45.7/35.3/10-iminated with propylene imine at a ratio of 1.3/1.0, imine to acid.
45 grams of titanium dioxide pigment with—

(2)—
1.0 gram of 46% solids in toluene of Kopox 159 (Koppers Co.-diglycidyl ether of resorcinol) prereacted with
0.083 gram of maleic anhydride Epoxide equivalent-final-$4.9 \times 10^{-3}$ epoxy equivalents per gram of solid polymer (theoretical $6.1 \times 10^{-3}$ epoxy equivalents per gram of solid polymer)
Bromine number—6.7 grams/100 grams
and reacted for 30 minutes at 100° C.

A 1 mil, surface-receptive film of clear polyvinyl fluoride containing ultra-violet absorber (3 weight percent of poly(4-methacryloxy-2-hydroxy-benzophenone)) was printed with the above adhesive composition-ink vehicle in a pattern, as described in the smear test, and then cured by heating at 100° C. for 72 hours (dried thickness—0.2 mil). The printed film was then laminated to a panel of an unsaturated polyester resin prepared as follows:

160 parts, by weight, of a mixture consisting of about 25% by weight of styrene and about 75% by weight of an unsaturated polyester formed by reacting a slight stoichometric excess of propylene glycol with a mixture consisting of about 60 mol percent of phthalic anhydride and about 40 mol percent of maleic anhydride.

40 parts of styrene
1 part of benzoyl peroxide
1 part of a 60% solution of methyl ethyl ketone hydroperoxide in dimethyl phthalate.
0.1 part of a solution consisting of about 6 parts by weight of cobalt naphthenates and about 51 parts by weight of naphthenic acids dissolved in about 43 parts by weight of mineral spirits.

The resin was cured and laminated at 125° C., and 100 p.s.i. for 2½ minutes. (Cured resin thickness—22 mils.) The laminate bonds were CNS initially and after one week in boiling water and visible light tests. No smear of the printed panel was evident.

EXAMPLE 4

The same ingredients, same proportions, were used as in Example 3 except that the maleic anhydride was not pre-reacted but added directly to the mix. Similar test results were obtained as with the pre-reacted material.

EXAMPLE 5

(A) A series of solutions were prepared by mixing various quantities of methacrylic acid with Kopox 159 (Koppers Co. -diglycidyl ether of resorcinol) and heating overnight at 60° C. These were then mixed with an iminated acrylate polymer (BA/BMA/MMA/MAA-9.0/45.7/35.3/10.0-iminated with propylene imine in a ratio of 1.3/1.0-imine to acid in a 8.75/1 weight ratio, sprayed onto 1 mil surface-receptive clear polyvinyl fluoride film containing 3 weight percent of poly(4-methacryloxy-2-hydroxy-benzophenone) dried and cured at 50° C. for one week (dried thickness—0.2 mil). The adhesive coated polyvinyl fluoride films were laminated to polymer resin panels as outlined in the previous examples. The results are shown in Table I.

TABLE I.—THE EFFECT OF METHACRYLIC ACID CONTENT ON ADHESION TO UNSATURATED POLYESTERS

| Percent Methacrylic Acid Added to Kopox 159* | Epoxide Equivalents/Gram Solid ($\times 10^{-3}$) | | Bromine Number (Gm./100 Gms.) | | Bond of Cured System | | |
|---|---|---|---|---|---|---|---|
| | Theoretical | Actual | Theoretical | Actual | Initial | 24 hrs. Boil | 1 wk. Boil |
| .001 | 7.8 | 7.8 | <.1 | ~0 | 300 | 0 | |
| .005 | 7.8 | 7.8 | <.1 | ~0 | CNS | 800 | 0 |
| .01 | 7.8 | 7.8 | <.1 | ~0 | CNS | CNS | 300 |
| .1 | 7.8 | 7.8 | <.1 | ~0 | CNS | CNS | CNS |
| 1 | 7.7 | 7.6 | 0.9 | 0.7 | CNS | CNS | CNS |
| 2 | 7.5 | 7.1 | 1.9 | 1.6 | CNS | CNS | CNS |
| 5 | 6.9 | 6.3 | 4.4 | 4.1 | CNS | CNS | CNS |
| 10 | 6.05 | 5.8 | 8.4 | 8.2 | CNS | CNS | CNS |
| 25 | 3.9 | 3.7 | 18.6 | 18.3 | CNS | CNS | CNS |
| 50 | 1.33 | 1.29 | 31.8 | 29.8 | CNS | CNS | CNS |

*50% MAA was 50 grams MAA/100 grams Kopox 159.
NOTE.—None of the above smeared in the polyester/styrene lamination.

(B) Similar to A, a series of solutions were prepared by mixing various quantities of methacrylic acid with the sulfur analogue of Epon 828 (Shell Development Co.) (prepared as described later). As in A, these were mixed with the iminated acrylic polymer in the same manner and tested. The results are shown in Table II.

TABLE II.—METHACRYLIC ACID RELATED WITH THE SULFUR ANALOGUE OF EPON 828, EFFECT ON BOND STRENGTH WITH UNSATURATED POLYESTERS

| Percent Methacrylic Acid | Epoxide Equivalents/ Gram Solid (×10⁻³) | | Bromine Number (Gm./100 Gms.) | | Bond of Cured System | | |
|---|---|---|---|---|---|---|---|
| | Theoretical | Actual | Theoretical | Actual | Initial | 24 hrs. Boil | 1 wk. Boil |
| .001 | 5.86 | 5.86 | <.1 | ~0 | 0 | 0 | 0 |
| .01 | 5.86 | 5.86 | <.1 | ~0 | CNS | 820 | 450 |
| .1 | 5.86 | 5.86 | <.1 | ~0 | CNS | CNS | CNS |
| 1 | 5.66 | 5.5 | 0.9 | 0.7 | CNS | CNS | CNS |
| 1 | 4.11 | 4.0 | 8.4 | 8.0 | CNS | CNS | CNS |

Preparation of the sulfur analogue of Epon 828 [1]

Seventy-five grams of Epon 828 was dissolved in 1.5 liters of acetone. Two hundred grams of potassium thiocyanate (powdered) was added. The mixture was stirred with refluxing for one hour. The salt was filtered off. The acetone was vacuum evaporated at room temperature. The residue was analyzed for thiirane sulfur which yielded 10.75% S or 62.6% conversion to the thiirane sulfur.

Weatherable structures of glass fiber-reinforced polyester plastics, because of their comparatively low cost and high strength-to-weight ratio, reinforced plastics, particularly those based on polyvinyl fluoride film/glass fiber-reinforced polyester systems are rapidly replacing other materials of construction in the manufacture of many shaped structures which are currently articles of commerce. Important among these structures are many which are exposed outdoors to the ravages of weathering either continually or at least intermittently during their use life. Among such structures may be included boat hulls and superstructure, life rafts and their containers, automobile bodies and detachable hard-tops, radar canopies and other antennae housings, rain shelters, aircraft radomes, harbor and channel buoys, outdoor walk-in telephone booths, horse trailers, aircraft wing and empennage tips, luggage trailers, some contour furniture, and chair seats for both indoor and outdoor use, swimming pools, forms for reinforced concrete, geodesic domed structures such as barns, auditoriums, etc., storage tanks for water and chemicals, house trailers, baby carriages, siks, sleds, toboggans, safety helmets, luggage, helicopter rotor blades, surfboards, highway and building signs, tanks for truck transport of liquids, cargo van bodies, agricultural animal trailers and in the construction of housing and other buildings in the form of roofings and sidings, skylights, awnings, flashing, rain gutters, downspouts and overhead garage doors.

$R_1$ is selected from the group consisting of hydrogen, hydroxyl radicals and alkyl radicals of from 1 to 8 carbon atoms; and $R_{11}$ is selected from the group consisting of hydrogen, non-tertiary alkyl radicals of from 1 to 8 carbon atoms and omega-hydroxy substituted non-tertiary alkyl radicals of from 1 to 8 carbon atoms; the amino nitrogen content of said vinyl polymer being at least 0.01%, based on weight of the vinyl polymer; and (2) the reaction product of (a) an epoxy ether partially reacted with (b) an ethylenically unsaturated compound of the formula

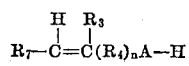

wherein $R_3$ is selected from the group consisting of hydrogen, carboxyl and alkyl radicals of from 1 to 4 carbon atoms, $n$ is zero or 1 and when $n$ is 1 $R_4$ is a divalent radical selected from the group consisting of divalent alkoxy, carbo-alkoxy, aromatic hydrocarbon, aliphatic hydrocarbon, and alicyclic hydrocarbon radicals, A is selected from the group consisting of —O—, —NH—,

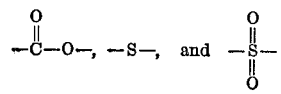

and $R_7$ is selected from the group consisting of hydrogen, carboxyl, carboalkoxy, sulfhydryl, sulfonic, amino, and non-hindered alkyl and alkyl-aromatic groups, said reaction product having unhindered ethylenic unsaturation, an epoxide equivalent of from 50 to 3000, and a bromine number of from 0.1 to 100; said components (1) and (2) being present in a ratio, by weight, of from 1:99 to 99:1.

2. The composition of claim 1 wherein said ethylenically unsaturated compound is methacrylic acid.

3. The composition of claim 1 wherein said ethylenically unsaturated compound is maleic anhydride.

4. A laminated structure comprising essentially a surface-receptive film of polyvinyl fluoride bonded by the adhesive composition of claim 1 to a substrate of a thermosetting resin having ethylenic unsaturation.

5. The laminate of claim 4 wherein the polyvinyl fluoride film is reverse printed.

6. The laminate of claim 4 wherein the substrate is an unsaturated polyester-styrene resin.

7. The laminate of claim 6 wherein the substrate is fiber-reinforced.

8. The laminate of claim 6 wherein the substrate is glass fiber-reinforced.

---

[1] A polyglycidyl ether of the composition of the formula:

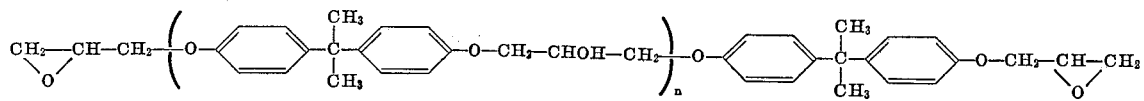

wherein $n$ is predominately zero.

What is claimed is:

1. An adhesive-printing ink vehicle composition comprising essentially an organic solvent solution of (1) a vinyl polymer having attached to the carbon-carbon-chain mono-valent radicals of the formula

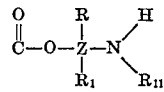

wherein Z is an aliphatic hydrocarbon radical of 2 to 3 carbon atoms; R is selected from the group consisting of hydrogen and alkyl radicals of from 1 to 8 carbon atoms;

(References on following page)

References Cited

UNITED STATES PATENTS

| | | | |
|---|---|---|---|
| 2,859,199 | 11/1958 | Parker | 161—185 X |
| 2,909,496 | 10/1959 | Cooke et al. | 161—185 X |
| 3,051,585 | 8/1962 | Weinberg et al. | 117—33.3 |
| 3,111,426 | 11/1963 | Capron et al. | 117—75 |
| 3,257,266 | 6/1966 | Sapper | 161—188 |
| 3,399,248 | 8/1968 | Wolinski | 260—837 |

HAROLD ANSHER, Primary Examiner

JOSEPH C. GIL, Assistant Examiner

U.S. Cl. X.R.

161—184, 188, 189, 195, 233; 260—836